United States Patent
Stanton et al.

[11] Patent Number: 6,113,116
[45] Date of Patent: Sep. 5, 2000

[54] OFF-ROAD TOWED RECREATIONAL VEHICLE

[75] Inventors: William H. Stanton, Winnipeg; Philip Fleury, St. Francois Xavier; William Whitehorn, Oak Lake, all of Canada

[73] Assignee: Equinox Industries Ltd., Winnipeg

[21] Appl. No.: 08/827,025

[22] Filed: Mar. 25, 1997

Related U.S. Application Data
[60] Provisional application No. 60/014,041, Mar. 25, 1996.

[51] Int. Cl.[7] .................................................. B62B 17/00
[52] U.S. Cl. .............................................. 280/24; 280/26
[58] Field of Search .............................. 280/22, 22.1, 24, 280/26, 20, 28, 124.17, 124.128, 124.129, 124.179, 47.331, 656

[56] References Cited

U.S. PATENT DOCUMENTS

| | | | |
|---|---|---|---|
| 754,610 | 3/1904 | Richards | 280/124.17 |
| 845,106 | 2/1907 | Maxim | 280/124.17 |
| 903,447 | 11/1908 | Bush | 280/124.17 |
| 4,374,591 | 2/1983 | Kobayashi | 280/28 |
| 4,522,425 | 6/1985 | Cornwall et al. | 280/124.128 |
| 5,082,307 | 1/1992 | Hollingsworth, Jr. | 280/656 |

*Primary Examiner*—Richard M. Camby
*Attorney, Agent, or Firm*—Murray E. Thrift; Adrian D. Battison

[57] ABSTRACT

A towed vehicle is towed behind such recreational off-road vehicles as snowmobiles and all terrain vehicles (ATV's). The vehicle has a body that is rotationally molded of low density polyethylene. It has an outer shell mounted on a vehicle frame and an inner shell suspended on the inside of the outer shell. The outer shell peripheral wall is formed to provide some resiliency to cushion the inner shell. The suspension of the vehicle includes a trailing arm and a one-quarter elliptical spring biasing the trailing arm away from the vehicle.

18 Claims, 5 Drawing Sheets

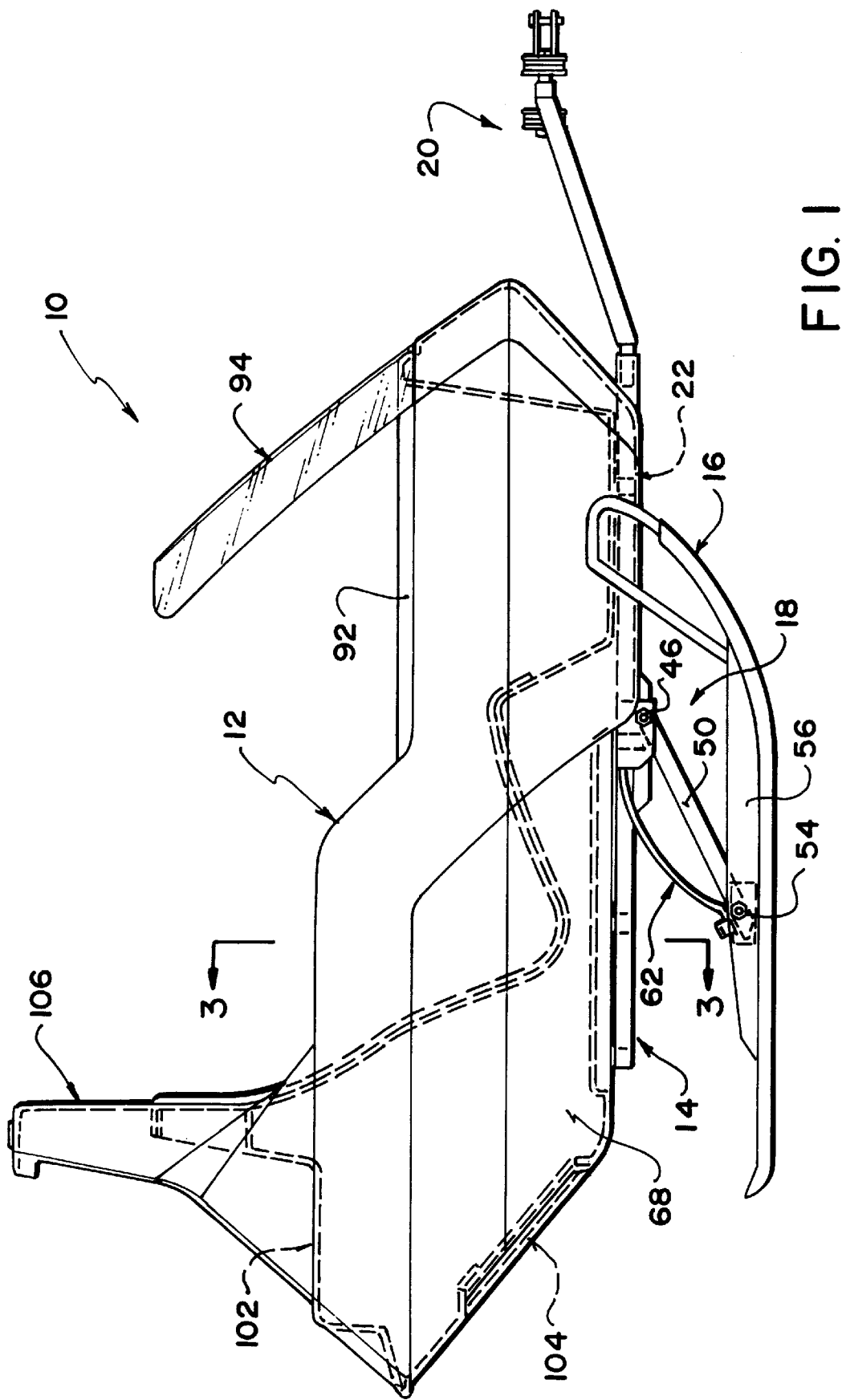

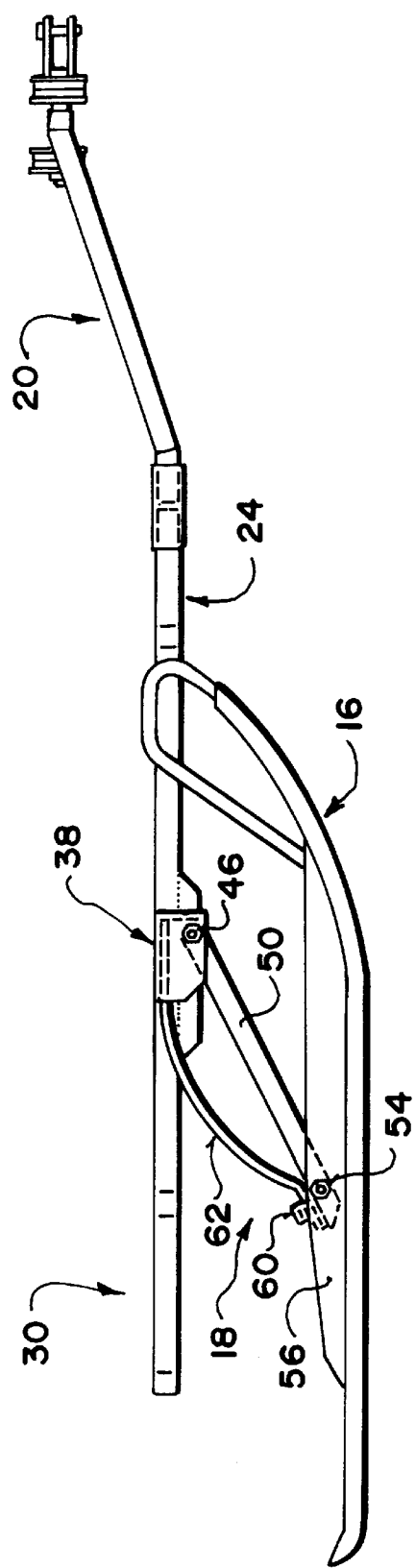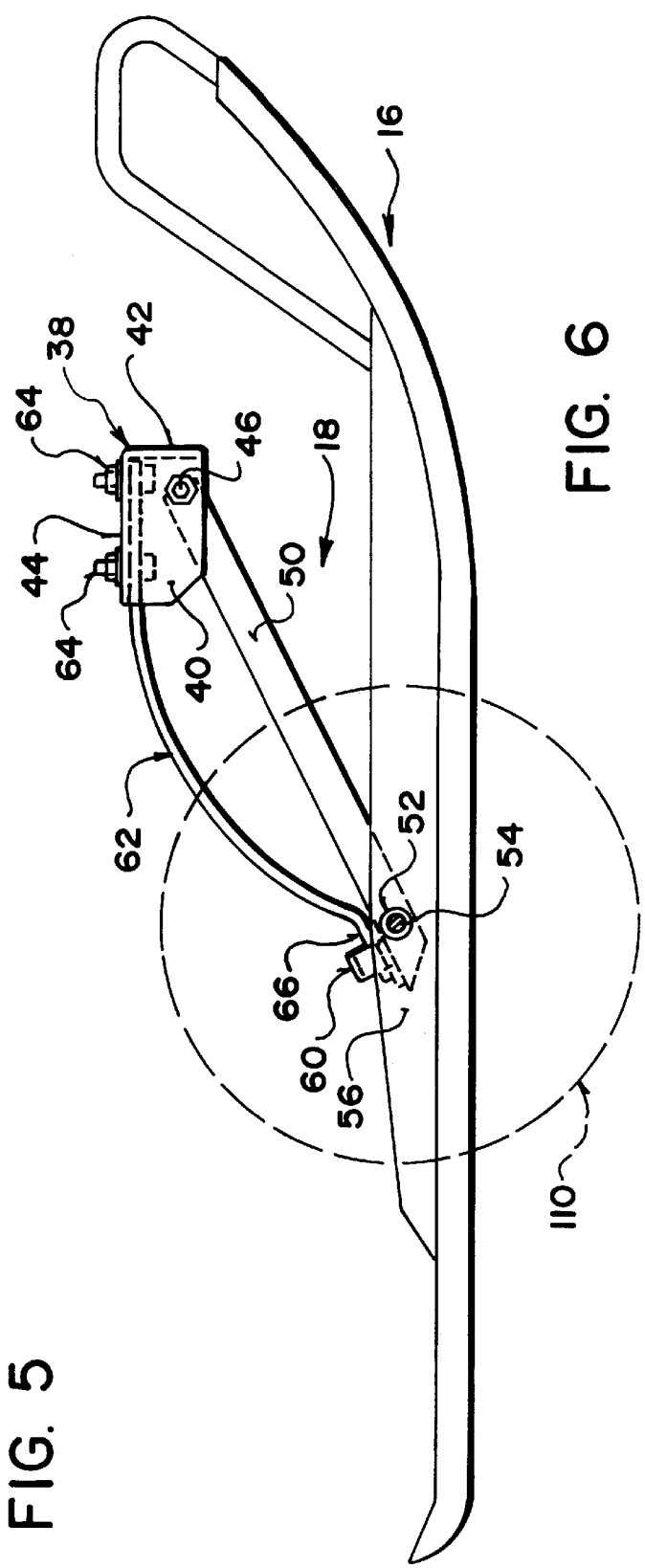

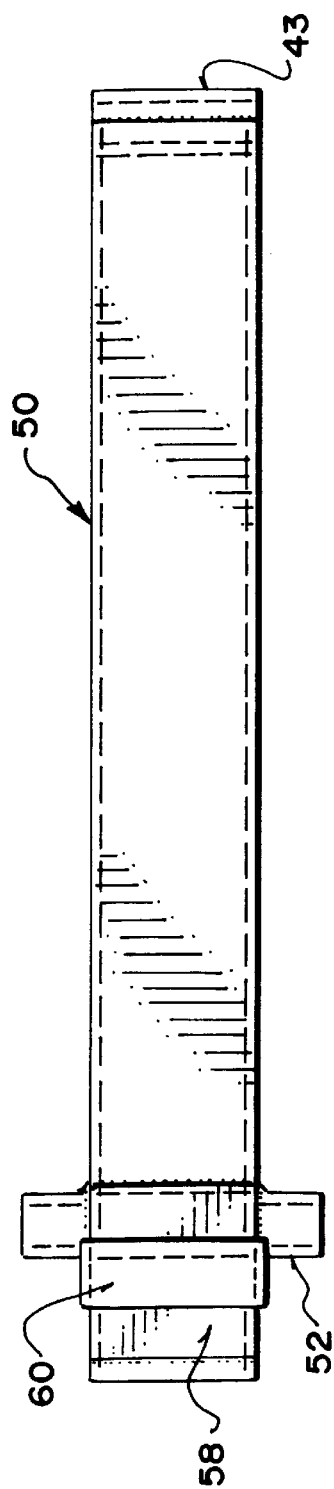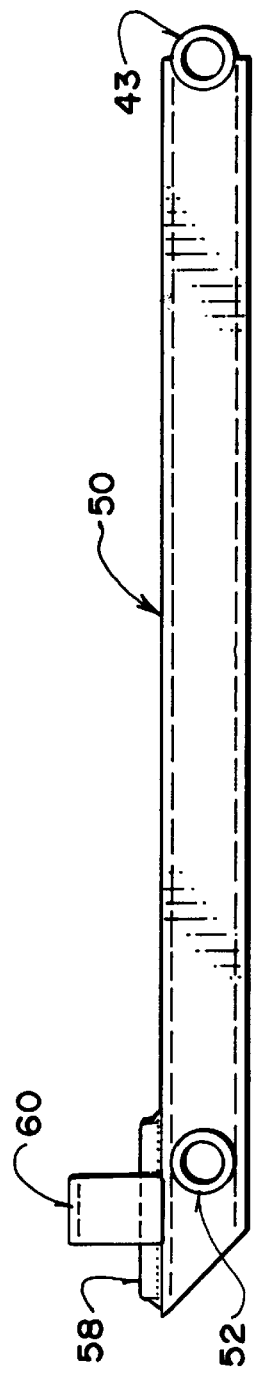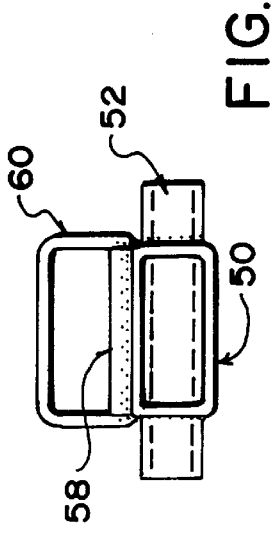

OFF-ROAD TOWED RECREATIONAL VEHICLE

This application claims the benefit of U.S. Provisional Application Ser. No. 60/014,041 filed Mar. 25, 1996.

FIELD OF THE INVENTION

The present invention relates to towed vehicles and especially to vehicles intended to be towed by off-road recreational vehicles, for example snowmobiles and all terrain vehicles (ATV's).

BACKGROUND

A snowmobile cutter is a passenger sleigh to be towed behind a snowmobile or ATV. These and similar trailers, either wheel or ski mounted, are conventionally manufactured with fiberglass shells mounted on the skis or wheels by leaf spring suspensions. Vehicles of this sort have a relatively hard ride and also have a tendency to flip or hop.

The present invention relates to certain improvements in this type of trailer vehicles.

SUMMARY

According to one aspect of the present invention there is provided a towed vehicle comprising:

a frame having front and back ends;

ground support means on opposite lateral sides of the frame;

suspension means mounting the respective ground support means on the frame, each suspension means including:

a trailing arm with leading and trailing ends, the leading end being pivotally mounted on the frame and sloping downwardly towards the back end of the frame; and a spring extending between the frame and the trailing arm to bias the trailing arm downwardly.

It is preferred that the spring is a one-quarter elliptical spring fixed to the frame at the upper end, near the trailing arm pivot and with a sliding engagement at the lower end with the trailing arm. The spring is positioned above the trailing arm to provide a downward pressure that is both sensitive and adequately supportive. The two trailing arms, being independent, provide an improved terrain following ride that ameliorates the tendency of the prior art trailers to flip or hop.

According to another aspect of the present invention there is provided a towed recreational vehicle comprising:

a frame;

ground support means mounted on the frame; and a double-walled plastic body mounted on the frame, said body including:

an inner shell for supporting a load carried by the trailer; and an outer shell mounted on the frame, the outer shell having a peripheral wall surrounding the inner shell and secured to the inner shell for supporting the inner shell spaced above the frame, the peripheral wall being resiliently deformable between the frame and the inner shell.

The resilient peripheral wall provides a cushioned support for the inner shell and a ride that is superior to that of the fiberglass units of the prior art. The peripheral wall of the outer shell is preferably convex, with panels that slope outwardly to a belt line on which the wall bends to provide the desired resilient suspension of the inner shell.

The double shell body is preferably rotationally molded as a unit from low density polyethylene. Kiss-off ribs may be used where stiffness is required, in the floor, while the main body of the unit is hollow to act as a resilient cushion. The preferred body has an anchored floor.

BRIEF DESCRIPTION OF THE DRAWINGS

In the accompanying drawings, which illustrate an exemplary embodiment of the present invention:

FIG. 1 is a side view of a snowmobile cutter according to the present invention;

FIG. 5 is a side view of the frame.

FIG. 6 is a side view of the suspension.

FIGS. 7, 8 and 9 are top, side and end views respectively of the trailing arm.

DETAILED DESCRIPTION

Figure 3:
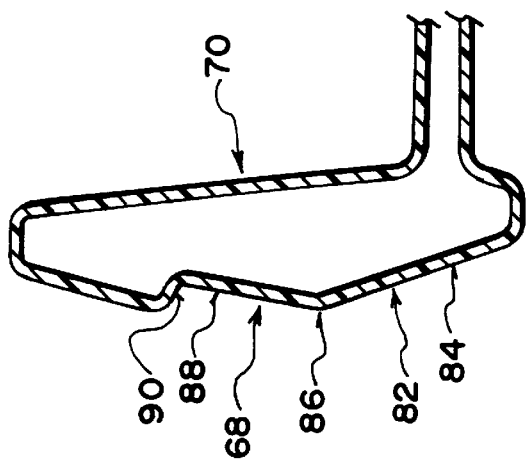
FIG. 3 is a view along line 3—3 of FIG. 1.
Figure 2:
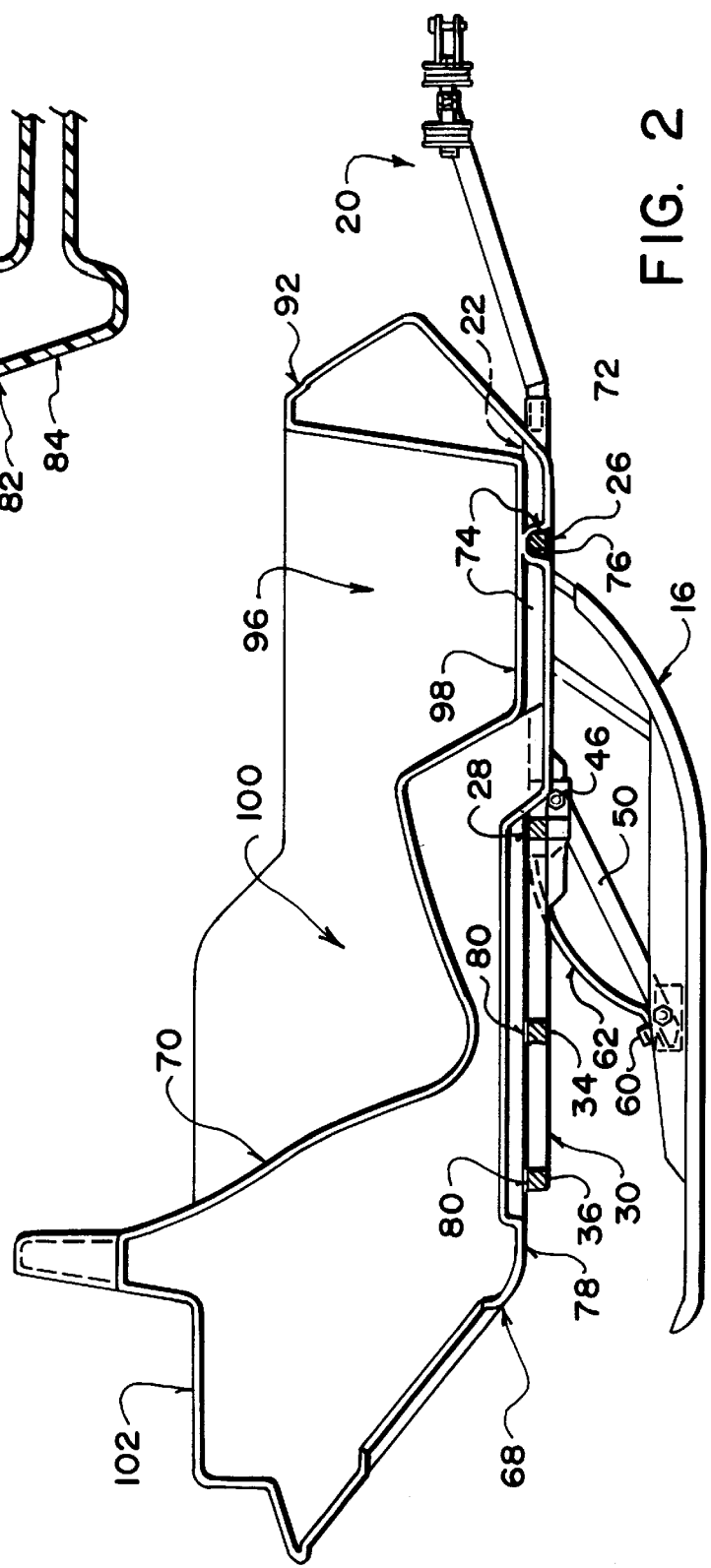
FIG. 2 is a longitudinal section of the cutter of FIG. 1.

Referring to the accompanying drawings, and especially to FIG. 1, there is illustrated a snowmobile cutter 10 with a body 12 mounted on a frame 14. The frame is mounted on two skis 16 by respective suspension assemblies 18. A tongue 20 projects forwardly from the cutter for connection to a snowmobile or other towing vehicle.

Figure 4:
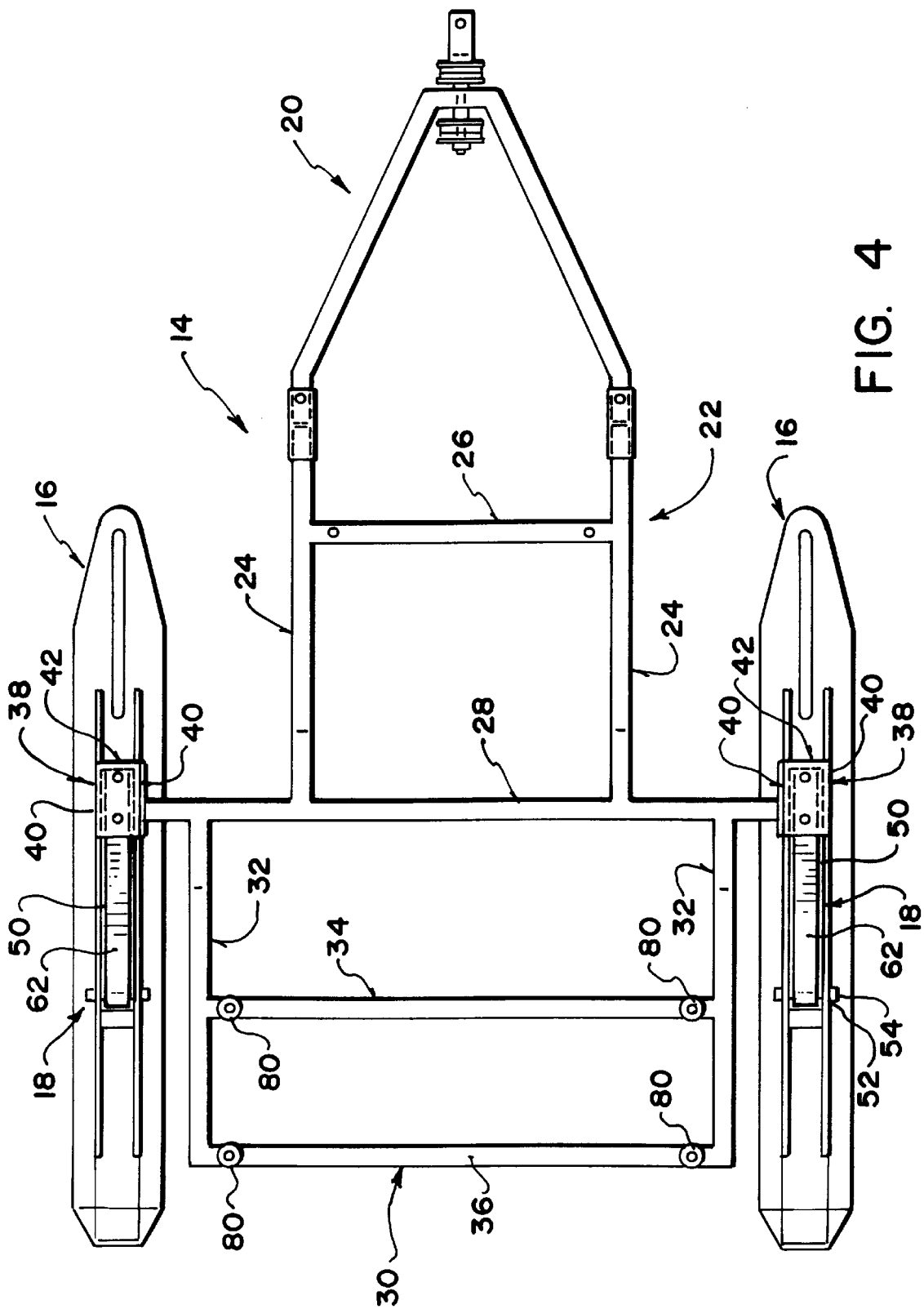
FIG. 4 is a plan view of the frame.

As illustrated most particularly in FIG. 4, the frame 14 has a front sub-frame 22 with two side members 24 connected at their front ends to the tongue 20. A cross member 26 joins the two side members 24. The back ends of the side members are connected to a main cross member 28. Extending to the back of the main cross member is a rear sub-frame 30 that includes two side members 32 joined by two cross members 34 and 36.

The suspensions 18 are located at opposite ends of the main cross member 28. Each suspension assembly includes a suspension shoe 38. The shoe has a pair of spaced side flanges 40 and a front flange 42 all depending from a top web 44. The inner side flange is fixed to the respective end of the cross member 28. A pivot bolt 46 extends across the shoe, through the side flanges 40 and forms a pivot for a bushing 48 mounted on the top end of a trailing arm 50 (FIGS. 7, 8 and 9). The arm slopes downwardly to the back from the shoe. Near the bottom end, the trailing arm has a transverse bushing 52 that rides on a pivot bolt 54 connecting the bottom end of the trailing arm to a bracket 56 on the respective ski 16.

On the top side of the trailing arm, at the bottom end, are a bearing plate 58 and a spring retainer loop 60 that extends across the top of the bearing plate.

A one-quarter elliptical spring 62 has its upper end secured to the suspension shoe 38 by two mounting bolts 64. The spring curves downwardly and to the rear over the trailing arm to a straight section 66 of the spring at its bottom end. The straight section rests on the top of the plate 58, inside the spring retainer loop 60. This form of spring is very sensitive but provides the necessary force to support the weight of the loaded vehicle.

The body 12 has a concave outer shell 68 and a concave inner shell 70. It is integrally molded by rotational molding from low density polyethylene. The outer shell has a front floor section 72 at the front. This is molded with ribs 74 that form downwardly open channels 76 to receive the members of the front sub-frame. These hold the body in place on the frame without exerting undue stresses in the plastic.

The back floor section 78 of the outer shell is positioned over the back subframe 30. It is supported on the subframe by a set of elastomeric spacers 80. Hold-down bolts (not shown) are used to secure the floor to the frame.

The outer shell has a convex wall 82 extending along the sides and across the front. Wall 82 has a lower panel 84 that slopes outwardly from the floor to a belt line 86. Above the belt line is an upper panel 88, joining the lower panel at an obtuse angle. Across the back, there is a distinct break 90 in the peripheral wall, above the belt line. This break is carried forward along the sides and then down to the floor. This structure makes the peripheral wall vertically resilient.

A recess 92 extends across the front of the peripheral wall, and part way along the sides, at the top of the wall. This recess supports a windshield 94.

The inner shell 70 is concave and set into the outer shell. It has a foot well 96 adjacent the front, with a floor 98 resting on and secured to the kiss-off ribs 74 of the outer shell front floor section 72. The floor 98 is held down on the frame by the hold-down bolts for the outer shell front floor. Behind the foot well, the inner shell is shaped into a seat 100. In front of the foot well and along the sides of the foot well and the seat, the inner shell extends upwardly to join the outer shell. Behind the seat is a deck 102.

At the rear of the body is a door 104 that provides access to the interior of the body for storage purposes.

An additional light support element 106 extends across the body and is fastened to the body at opposite sides of the seat.

With the meeting of the upper panel 88 and the lower panel 84 along the obtuse angled belt line 86, the belt line acts as a hinge line, providing resilient flexibility in the outer shell that allows the inner shell to move against the resilience of the bending action of the outer shell. This cushions the ride of the trailer.

FIG. 6 illustrates in broken line a wheel 110 mounted on the vehicle by the suspension. This arrangement is useful where the vehicle is to be towed by an ATV.

While one embodiment of the present invention has been disclosed in the foregoing, it is to be understood that other embodiments are possible within the scope of the invention and are intended to be included within the scope of this application. The invention is to be considered limited solely by the scope of the appended claims.

We claim:

1. A towed vehicle comprising:
    a frame having front and back ends;
    two ground support means on opposite lateral sides of the frame;
    two suspension means mounting the respective ground support means on the frame, each suspension means including:
        a trailing arm with leading and trailing ends, the leading end being pivotally mounted on the frame and sloping downwardly towards the back end of the frame; and
        a part elliptical spring positioned above and extending along the associated trailing arm, the spring having one end fixed to the frame and an opposite end slidably engaged with the trailing arm to bias the trailing arm downwardly.

2. A vehicle according to claim 1 wherein the ground support means comprise skis.

3. A vehicle according to claim 1 wherein the ground support means comprise wheels.

4. A towed recreational vehicle comprising:
    a frame;
    ground support means mounted on the frame; and
    a double-walled plastic body mounted on the frame, said body including:
        an inner shell for supporting a load carried by the trailer; and
        an outer shell mounted on the frame, the outer shell having a peripheral wall surrounding the inner shell and secured to the inner shell for supporting the inner shell spaced above the frame, the peripheral wall being resiliently deformable between the frame and the inner shell.

5. A vehicle according to claim 4 wherein the outer shell comprises a floor secured to the frame.

6. A vehicle according to claim 5 wherein the inner shell has a floor portion secured to the floor of the outer shell.

7. A vehicle according to claim 1 wherein the floors of the shells are secured together by kiss-off ribs.

8. A vehicle according to claim 4 wherein the ground support means comprise two ground engaging means on respective opposite sides of the vehicle and suspension means on each side of the vehicle supporting the frame on the ground engaging means.

9. A vehicle according to claim 8 wherein the suspension means comprise:
    a trailing arm with leading and trailing ends, the leading end being pivotally mounted on the frame and sloping downwardly towards the back end of the frame; and
    spring means extending between the frame and the trailing arm so as to bias the trailing arm downwardly.

10. A towed vehicle according to claim 9 wherein the spring is part elliptical and is positioned above and extends along the associated trailing arm.

11. A vehicle according to claim 10 including means fixing an upper end of the spring to the frame, the opposite end of the spring being slidably engaged with the trailing arm.

12. A vehicle according to claim 10 wherein the ground support means comprise skis.

13. A vehicle according to claim 10 wherein the ground support means comprise wheels.

14. A towed recreational vehicle comprising:
    a frame;
    ground support means mounted on the frame; and
    a double-walled plastic body mounted on the frame, said body including:
        an outer shell having a floor secured to the frame and a resiliently deformable peripheral wall upstanding from the floor; and
        an inner shell for supporting a load carried by the trailer, the inner shell having a floor portion secured to the floor of the outer shell and a load support portion spaced above the floor of the outer shell and secured to the peripheral wall of the outer shell above the floor of the outer shell, whereby the load support portion of the inner shell is resiliently supported by the peripheral wall of the outer shell.

15. A vehicle according to claim 14 wherein the floor portion of the inner shell and the floor of the outer shell are secured together by kiss-off ribs.

16. A vehicle according to claim 14 wherein the suspension means comprise:
    a trailing arm with leading and trailing ends, the leading end being pivotally mounted on the frame and sloping downwardly towards the back end of the frame; and spring means extending between the frame and the trailing arm so as to bias the trailing arm downwardly.

17. A towed vehicle according to claim 16 wherein the spring is part elliptical and is positioned above and extends along the associated trailing arm.

18. A vehicle according to claim 17 including means fixing an upper end of the spring to the frame, the opposite end of the spring being slidably engaged with the trailing arm.

* * * * *